United States Patent

Ng

(10) Patent No.: US 8,638,053 B2
(45) Date of Patent: Jan. 28, 2014

(54) MOTOR CONTROL CIRCUIT AND METHOD THAT SYNCHRONIZE A SPEED OF AN ELECTRIC MOTOR TO AN EXTERNAL CLOCK SIGNAL

(75) Inventor: Chee-Kiong Ng, Acton, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 217 days.

(21) Appl. No.: 13/278,458

(22) Filed: Oct. 21, 2011

(65) Prior Publication Data

US 2013/0099706 A1 Apr. 25, 2013

(51) Int. Cl.
*H02P 6/08* (2006.01)
*H02P 6/16* (2006.01)

(52) U.S. Cl.
USPC .......... 318/400.14; 318/400.13; 318/400.2; 318/400.3; 318/400.04; 318/400.01; 318/700; 318/606; 318/607; 318/400.05

(58) Field of Classification Search
USPC .............. 318/400.05, 400.01, 700, 400.14, 318/400.13, 400.1, 400.3, 705, 606, 607, 318/600, 400.2
See application file for complete search history.

(56) References Cited

U.S. PATENT DOCUMENTS

| 4,223,261 A | 9/1980 | White |
| 4,494,052 A * | 1/1985 | Kelleher et al. .......... 318/400.11 |
| 4,661,756 A | 4/1987 | Murphy et al. |
| 5,811,954 A | 9/1998 | Randall |
| 5,814,965 A | 9/1998 | Randall |
| 5,923,141 A | 7/1999 | McHugh |
| 7,085,484 B2 | 8/2006 | Hara |
| 7,365,765 B2 * | 4/2008 | Dan .............................. 347/261 |
| 7,397,883 B2 * | 7/2008 | Hattori ......................... 375/376 |
| 7,509,032 B2 * | 3/2009 | Jami ............................ 388/811 |
| 7,541,760 B2 * | 6/2009 | Lin et al. .................. 318/400.01 |
| 7,590,334 B2 | 9/2009 | Yabusaki et al. |
| 7,747,146 B2 | 6/2010 | Milano et al. |
| 8,259,150 B2 * | 9/2012 | Kubo ............................ 347/261 |
| 2012/0007529 A1 * | 1/2012 | Kim et al. .................. 318/400.04 |

FOREIGN PATENT DOCUMENTS

| JP | 2005-110471 | 4/2005 |
| JP | 2006-058364 | 3/2006 |
| JP | 2006-287990 | 10/2006 |
| JP | 2009-124864 | 6/2009 |
| JP | 2011-109866 | 6/2011 |

OTHER PUBLICATIONS

"A4920 3-Phase Controller;" Allegro Microsystems, Inc. Concept Data Sheet; Jul. 8, 2011; 12 pages.
PCT International Search Report and Written Opinion of the ISA; dated Jul. 18, 2013; for PCT Pat. App. No. PCT/US2012/055422; 8 pages.
Ng; "Motor Control Circuit and Method that Reduce Speed Jitter of an Electric Motor;" U.S. Appl. No. 13/278,462, filed Oct. 21, 2011; 37 pages.
U.S. Appl. No. 13/271,723, filed Oct. 12, 2011.
Office Action dated Sep. 20, 2013; for U.S. Appl. No. 13/278,461; 13 pages.
Response fled Dec. 9, 2013; to Office Acton dated Sep. 20, 2013; for U.S. Appl. No. 13/278,461; 11 pages.

* cited by examiner

*Primary Examiner* — Rita Leykin
(74) *Attorney, Agent, or Firm* — Daly, Crowley, Mofford & Durkee, LLP

(57) ABSTRACT

Motor control circuits and associated methods to control an electric motor provide an ability to synchronize a rotational speed of the electric motor with an external clock signal, resulting in reduced jitter in the rotational speed of the electric motor.

22 Claims, 10 Drawing Sheets

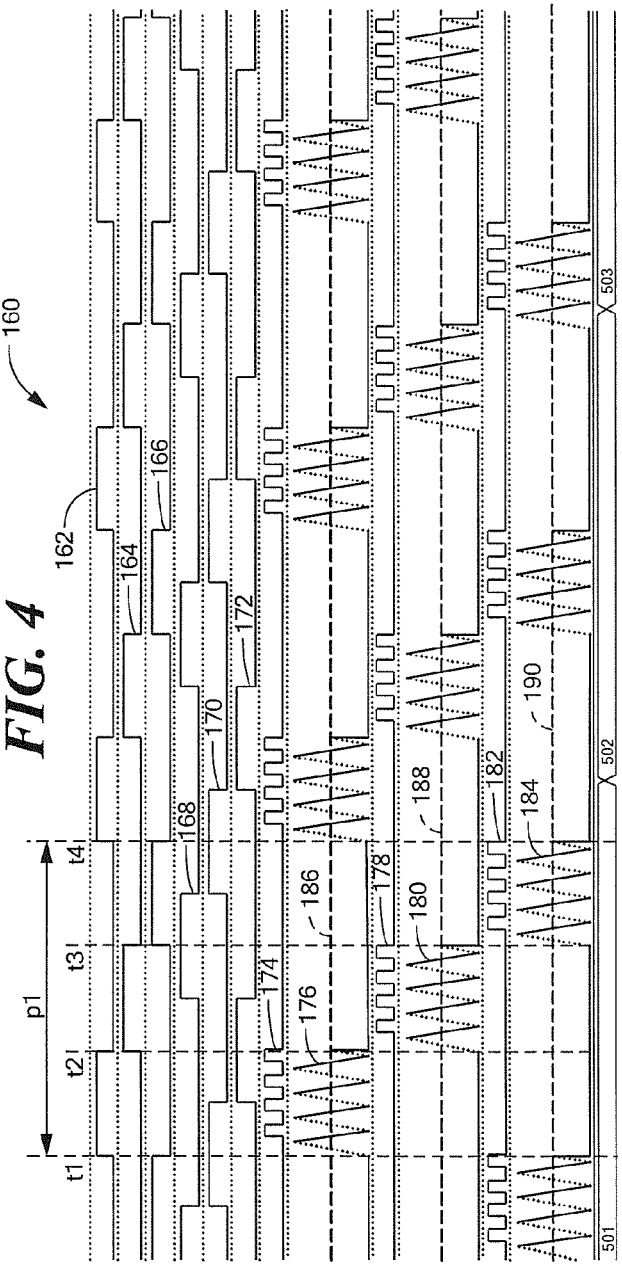
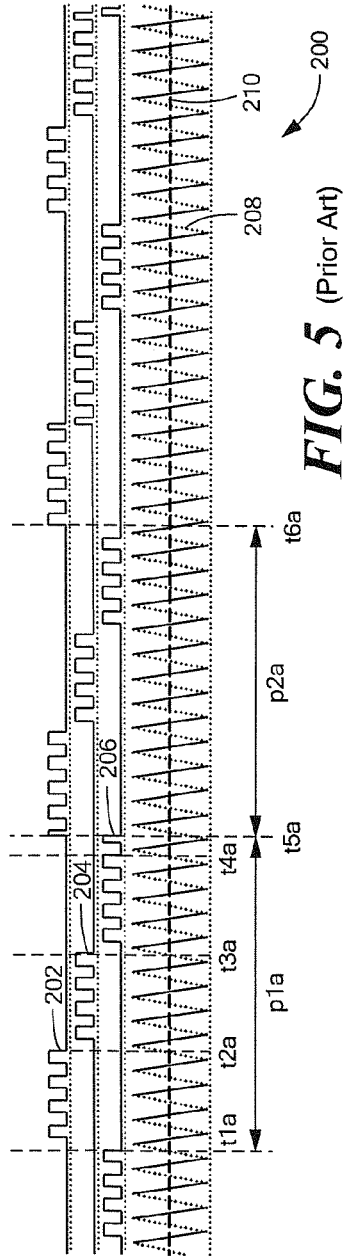
FIG. 4
FIG. 5 (Prior Art)

MOTOR CONTROL CIRCUIT AND METHOD THAT SYNCHRONIZE A SPEED OF AN ELECTRIC MOTOR TO AN EXTERNAL CLOCK SIGNAL

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to electric motor control circuits and, more particularly, to an electric motor control circuit that can provide synchronization with an external frequency signal and that can also provide a reduced amount of motor speed jitter.

BACKGROUND OF THE INVENTION

Circuits to control and drive brushless DC (BLDC) electric motors are known. Conventionally, the circuits provide one function signal from which a plurality motor drive signals, each at a different phase, are derived.

Some known electric motor drive circuits are described in U.S. Pat. No. 7,590,334, issued Sep. 15, 2009, U.S. Pat. No. 7,747,146, issued Jun. 29, 2010, and U.S. patent application Ser. No. 13/271,723, filed Oct. 12, 2011 and entitled "Electronic Circuit And Method Generating Electric Motor Drive Signals Having Phase Advances In Accordance With A User Selected Relationship Between Rotational Speed Of An Electric Motor And The Phase Advances," each of which is assigned to the assignee of the present invention.

A BLDC electric motor can exhibit jitter it its speed of rotation when driven by a conventional motor drive circuit. In some applications, for example, motors used in printers, for example, inkjet printers, can experience an undesirable amount of jitter. In these particular applications, the jitter results in printing clarity reduction.

The amount of jitter in the rotational speed of electric motor driven by conventional motor control circuit is related to the fact that the above-described function signal within the motor control circuit does not necessarily align with the motor rotations such that an exact number of cycles of the function signal is achieved for each rotation of the motor.

In view of the above, it would be desirable to provide a motor control circuit and associated method that can generate electric motor drive signals to more accurately control, more accurately than a conventional motor control circuit, the speed of rotation of an electric motor, thereby reducing jitter in the rotational speed of the electric motor. It would also be desirable to provide a motor control circuit that can drive the motor at a rotational speed synchronized with an external clock signal received by the motor control circuit.

SUMMARY OF THE INVENTION

The present invention provides a motor control circuit and associated method that can generate electric motor drive signals to more accurately control, more accurately than a conventional motor control circuit, the speed of rotation of an electric motor, thereby reducing jitter in the rotational speed of the electric motor. The present invention also provides a motor control circuit that can drive the motor at a rotational speed synchronized with an external clock signal received by the motor control circuit.

In accordance with one aspect of the present invention, a circuit for driving a multi-phase brushless DC motor, the motor having a motor shaft and a plurality of motor windings, includes a position signal generator configured to generate a plurality of position signals. Each one of the plurality of position signals is representative of a rotational position of the motor shaft. The circuit further includes a frequency difference processor coupled to receive a signal related to a selected one of the position signals, coupled to receive a reference clock signal, and configured to generate a frequency difference value related to a frequency difference between the signal related to the selected one of the position signals and the reference clock signal. The circuit further includes a synchronization control processor coupled to receive the frequency difference value and configured to generate a synchronization selection signal. The circuit further includes a multiplexer having a first input node coupled to receive the signal related to the selected one of the position signals, a second input node coupled to receive the reference clock signal, a control node coupled to receive the synchronization control signal, and an output node at which is generated a multiplexer output signal comprised of either the signal related to the selected one of the position signals or the reference clock signal.

In accordance with another aspect of the present invention, a method of driving a multi-phase brushless DC motor, the motor having a motor shaft and a plurality of motor windings, includes generating a plurality of position signals. Each one of the plurality of position signals is representative of a rotational position of the motor shaft. The method further includes generating a frequency difference value related to a frequency difference between the signal related to the selected one of the position signals and the reference clock signal. The method further includes generating a synchronization selection signal in accordance with the frequency difference value. The method further includes generating, in accordance with the synchronization selection signal, a multiplexer output signal comprised of either the signal related to the selected one of the position signals or the reference clock signal.

BRIEF DESCRIPTION OF THE DRAWINGS

The foregoing features of the invention, as well as the invention itself may be more fully understood from the following detailed description of the drawings, in which:

FIG. 4 is a graph showing signal waveforms within the motor control circuit of FIG. 1, including signal waveforms associated with the plurality of modulation waveform generators of FIG. A;

FIG. 5 is a graph showing signal waveforms within a conventional motor control circuit, which has one modulation waveform generator;

DETAILED DESCRIPTION OF THE INVENTION

Before describing the present invention, some introductory concepts and terminology are explained. As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular Hall element. As is also known, there are different types of magnetoresistance elements, for example, a giant magnetoresistance (GMR) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, most types of magnetoresistance elements tend to have axes of maximum sensitivity parallel to the substrate and most types of Hall elements tend to have axes of sensitivity perpendicular to a substrate.

As used herein, the term "magnetic field sensor" is used to describe a circuit that includes a magnetic field sensing element. Magnetic field sensors are used in a variety of applications, including, but not limited to, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

As used herein, the term "signal" is used to describe an electronic characteristic, analog or digital, that tends to change rapidly. In contrast, as used herein, the term "value" is used to describe a digital electronic value that tends to be static, or the tends to change slowly or from time to time. However the terms signal and value can be used interchangeably.

Figure 1:
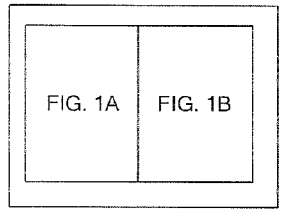
FIG. 1 is a block diagram showing an exemplary motor control circuit having a plurality of modulation waveform generators and having a forced synchronization control, the motor control circuit coupled to an electric motor, the motor having Hall effect magnetic field sensing elements disposed therein to generate signals representative of an angle of rotation of the motor shaft.
Figure 1A:
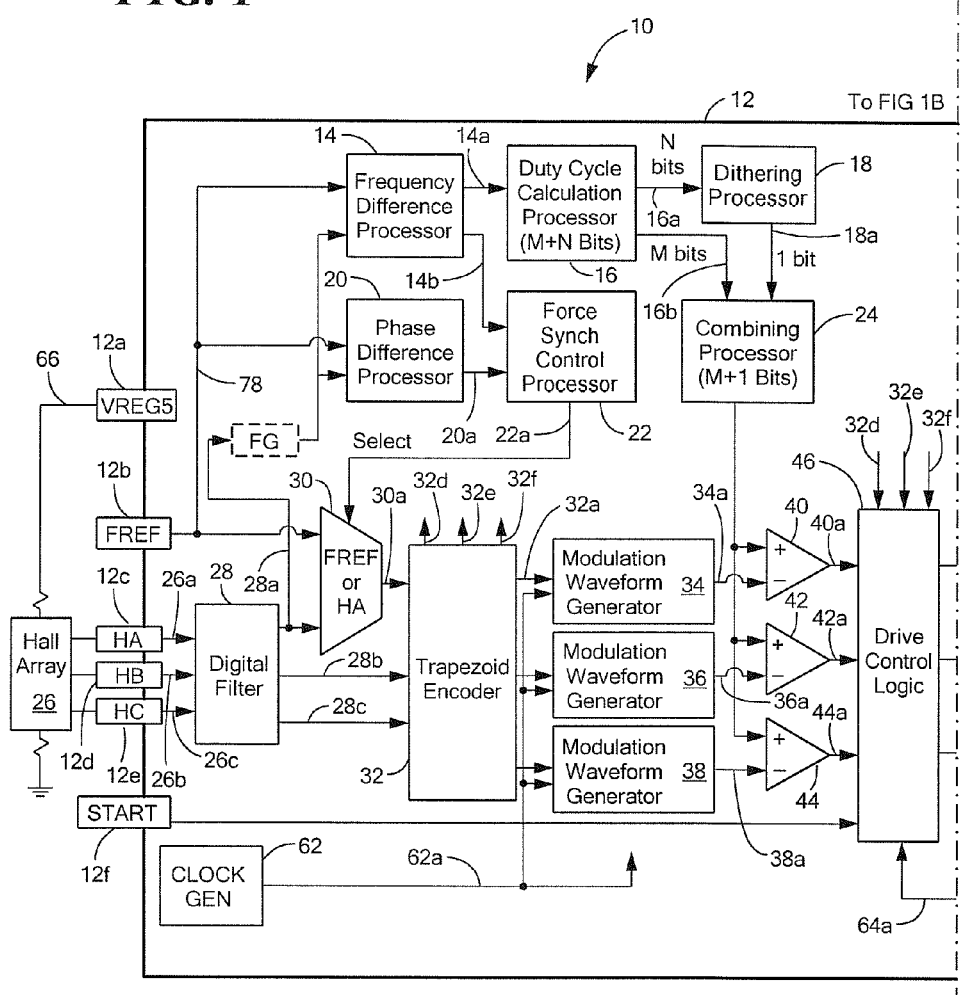
Figure 1B:
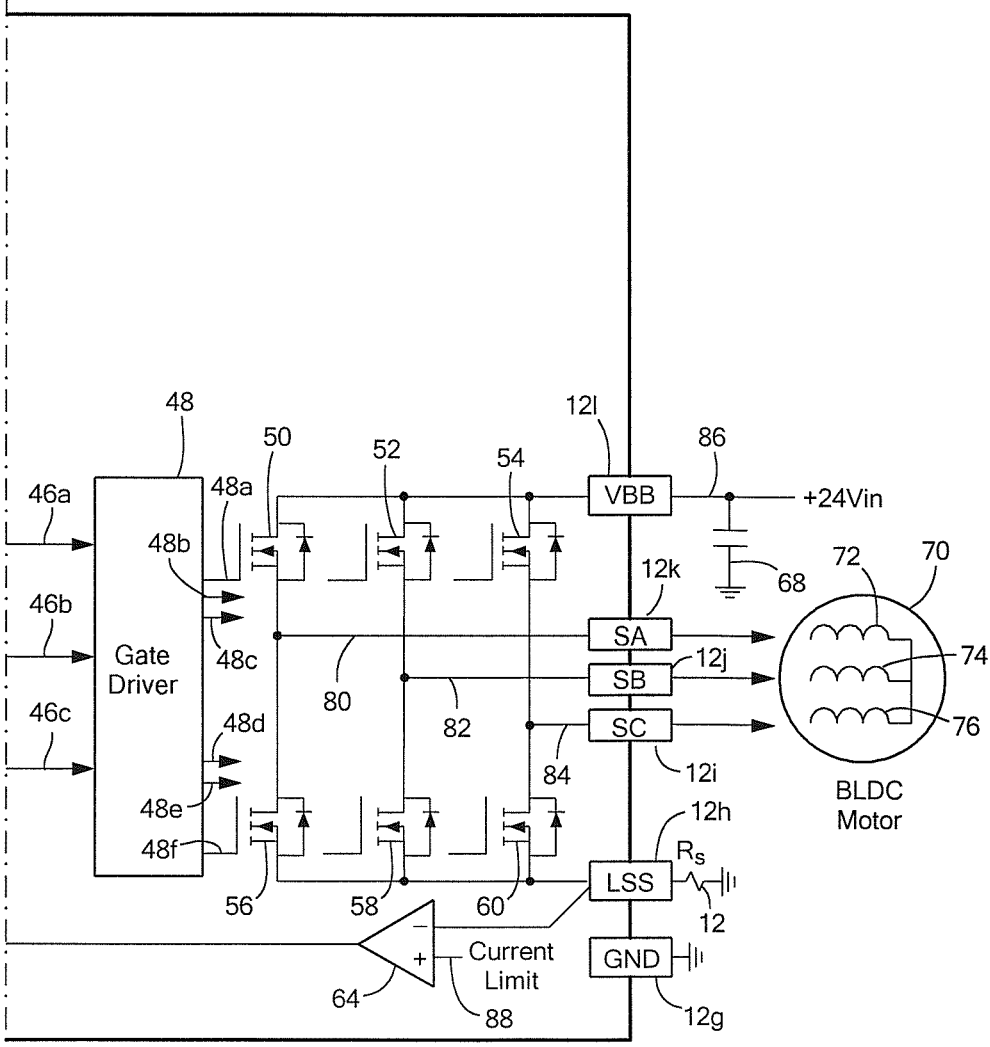

Referring to FIG. 1, a motor drive arrangement 10 that includes an exemplary electronic circuit 12 coupled to an electric motor 70 and to a Hall array 26, has a plurality of pins 12a-12l with respective functions and couplings described below.

Pin 12a, a regulated voltage pin (VREG), is coupled to receive a regulated voltage 66 from outside of the electronic circuit 12. The regulated voltage 66, or alternatively, a regulated current, is provided to the array of Hall effect elements 26. The regulated voltage 66 provides power to most of the circuitry three within the electronic circuit 12.

Pin 12b, a frequency reference pin (FREF), is coupled to receive a frequency reference signal 78 from outside of the electronic circuit 12. As described in greater detail below, functions of the electronic circuit 12 can be synchronized with the frequency reference signal 78.

Pins 12c-12e, Hall A, Hall B, and Hall C (HA, HB, HC) pins, are coupled to receive respective signals from Hall effect elements, which are magnetic field sensing elements, within the Hall array 26.

Pin 12f, a start pin (START), is coupled to receive a control signal from outside of the electronic circuit 12. The control signal can start and stop the functions of the electronic circuit 12, and therefore, start and stop the electric motor 70.

Pin 12g, a ground pin (GND), provides a power supply ground for the electronic circuit 12.

Pin 12h, a lower supply pin (LSS), is coupled to receive a lower power supply voltage from outside of the electronic circuit 12. The lower power supply is one of two voltages sent to the electric motor 70 in a pulse width modulated (PWM) arrangement described more fully below.

Pins 12k, 12j, 12i, motor drive signal pins (SA, SB, SB, respectively), are coupled to provide PWM drive signals 80, 82, 84, respectively, to the electric motor 70.

Pin 12l, an upper supply pin (VDD), is coupled to receive an upper power supply voltage from outside of the electronic circuit 12. The upper power supply is the other one of the two voltages sent to the electric motor 70 in the pulse width modulated (PWM) arrangement described more fully below.

It should be understood that the Hall array 26 is disposed in close proximity to the electric motor 70, but is shown here at a different position for clarity of the electronic circuit 12.

In operation of the motor control circuit 12, Hall effect elements within the Hall array 26, for example, three Hall effect elements, are positioned to sense magnetic fields, and, in particular, varying magnetic field, of magnets within the electric motor 70 as a shaft of the electric motor 70 rotates. In one particular embodiment, the three Hall effect elements 26 can be disposed at positions relative to the electric motor 70 that are one hundred twenty degrees apart about an axis of rotation of the shaft of the electric motor.

The three Hall effect elements within the Hall array 26 generate position signals 26a, 26b, 26c, which are received by a digital filter 28. The position signals 26a, 26b, 26c are generally analog signals, and each is representative of an angle of rotation of the shaft of the electric motor 70.

Conversion to digital signals is not shown in FIG. 1, but it is presumed that the position signals 26a-26c are either converted before the digital filter 28 or within the digital filter 28. The digital filter 28 is configured to generate filtered signals 28a, 28b, 28c, each of which is representative of a respective one of the position signals 26a, 26b, 26c. The filtered signals 28a, 28b, 28c can be, for example, multi-bit digital signals. The filtered signals 28a, 28b, 28c are also representative of the angle of rotation of the shaft of the electric motor 70.

A multiplexer 30 is coupled to receive the filtered signal 28a and configured to provide a signal 30a. At the beginning of operation of the electronic circuit 12, the multiplexer 30 is switched to provide the signal 30a to be the same as the filtered signal 28a. Operation of the multiplexer 30 is described more fully below.

A so-called "trapezoid encoder" 32 is coupled to receive the signal 30a, and also the filtered signals 28b, 28c. A trapezoid encoder will be understood to be a form of pattern generator and is also referred to as a pattern generator herein.

The trapezoid encoder 32 is configured to generate output signals 32a, 32b, 32c (also referred to herein as pattern signals), which can be single bit square wave signals. In some embodiments the three output signals 32a, 32b, 32c have phases one hundred twenty degrees apart. The trapezoid encoder 32 is also configured to generate signals 32d, 32e, 32f. The output signals 32a-32f are described more fully below in conjunction with FIGS. 2-4.

The electronic circuit 12 further includes a plurality of modulation waveform generators 34, 36, 38, each coupled to receive a respective one of the output signals 32a, 32b, 32c from the trapezoid encoder 32. Operation of the modulation waveform generators 34, 36, 38 is described more fully below. Let it suffice here to say that the modulation waveform generators are configured to generate respective output signals 34a, 36a, 38a, which are functioned signals, for example, triangle wave signals or sawtooth wave signals.

A clock generating circuit 62 provides a clock signal 62a to each one of the modulation waveform generators 34, 36, 38. The clock signal 62a can also be provided to other portions of the electronic circuit 12.

The electronic circuit 12 can also include a plurality of comparators 40, 42, 44, each coupled to receive a respective one of the output signals 34a, 36a, 38a from a respective one of the modulation waveform generators 34, 36, 38. Each one of the plurality of comparators 40, 42, 46 is also coupled to receive a threshold value 24a, shown here to be the same threshold value 24a. However in other embodiments, each one of the comparators 40, 42, 44 can be coupled to receive a different respective threshold value.

The plurality of comparators 40, 42, 44 is configured to compare respective ones of the output signals 34a, 36a, 38a from the plurality of modulation waveform generators 34, 36, 38 with the threshold value 24a to generate a respective plurality of output signals 40a, 42a, 44a, as pulse width modulated (PWM) signals.

Digital control logic 46 is coupled to receive the pulse width modulated signals 40a, 42a, 44a and configured to generate preliminary drive signals 46a, 46b, 46c.

A gate driver circuit 48 is coupled to receive the preliminary drive signals 46a, 46b, 46c and configured to generate gate drive signals 48a-48f. For clarity, only two of the gate drive signals are shown to be coupled, but the other couplings should be apparent.

Three high side field effect transistors (FETs) 50, 52, 54 are coupled to receive the gate drive signals 48a, 48b, 48c, respectively, and three low side FETs 56, 58, 60 are coupled to receive the gate drive signals 48f, 48e, 48d, (signals 172, 170, 168 of FIG. 4), respectively. The gate drive signals 48a-48f cause the FETs 52-60 to operate in saturation with pulse width modulation, and thus, consume only a small amount of power.

The arrangement of the FETs 52-60 is configured to generate three drive signals 80, 82, 84, which are coupled to ends of respective ones of windings 72, 74, 76 within the electric motor 70. Other ends of the windings 72, 74, 76 can be coupled together.

The electronic circuit 12 can also include a frequency difference processor 14 coupled to receive the filtered signal 28a and also coupled to receive the frequency reference signal 78 from outside of the electronic circuit 12. The frequency difference processor 14 is configured to generate frequency difference values 14a, 14b, each having a magnitude representative of a frequency difference between the frequency reference signal 78 and the filtered signal 28a.

The electronic circuit 12 can include a duty cycle calculation processor 16 coupled to receive the frequency difference value 14a and configured to generate a duty cycle value 16a having N bits and another duty cycle value 16b having M bits, which can be considered together to be one digital word having M+N bits. The duty cycle value 16a can be considered to be the lower order bits of the one digital word. In some embodiments M=8 and N=4. However, in other embodiments M can be greater than or less than eight, and N can be greater than or less than four.

The electronic circuit 12 can also include a dithering processor 18 coupled to receive the duty cycle value 16a and configured to generate a one bit dithered value 18a having a dithering characteristic. Dithering will be understood to be a technique used in a variety of applications that can translate a value, for example, the duty cycle value 16a, into an occurrence rate of the dithered value 18a, e.g., a one versus a zero. Dithering is most often used to result in a reduction of a number of required bits in a digital word in an application, while still achieving the same ultimate resolution in the application as that which would be achieved without reducing the number of required bits.

In other embodiments, the dithered value 18a can have more than one bit. However, generally speaking, the desired value 18a has fewer bits than the duty cycle value 16a.

The electronic circuit 12 can also include a combining processor 24 coupled to receive the dithered value 18a having one bit, coupled to receive the duty cycle value 16b having M bits, and configured to combine the values to generate a dithered value 24a having M+1 bits.

It will be understood that the dithered value 24a, which has M+1 bits, results in substantially the same system resolution as a combination of the duty cycle values 16a, 16b, which together have M+N bits. However, if instead, the electronic circuit 12 used the combination of the duty cycle values 16a, 16b having M+N bits, various parts of the electronic circuit 12 would need to operate at a faster clock rate. The faster clock rate would result in substantially more power consumed by the electronic circuit 12.

The electronic circuit 12 can also include a phase difference processor 20 coupled to receive the filtered signal 28a and also coupled to receive the frequency reference signal 78 from outside of the electronic circuit 12. The phase difference processor 20 is configured to generate a phase difference value 20a having a magnitude representative of a phase difference between the frequency reference signal 78 and the filtered signal 28a.

The electronic circuit 12 can also include a force synchronization control processor 22 coupled to receive the frequency difference signal 14b, (optionally) coupled to receive the phase difference signal 20a, and configured to generate a selection signal 22a. The selection signal 22a is received by the multiplexer 30. The multiplexer 30 is also coupled to receive the frequency reference signal 78 from outside of the electronic circuit 12. The selection signal 22a selects which one of the frequency reference signal 78 or the filtered signal 28a passes through the multiplexer 30 to generate the signal 30a.

In operation, when first powered up, the electronic circuit 12 operates with the multiplexer 30 selected to provide the filtered signal 28a as the signal 30a.

Using the filtered signal 28a results in the electric motor 70, and, in particular, a shaft of the electric motor 70, turning faster and faster.

As the motor 70 spins faster and faster, a frequency of the filtered signal 28a approaches the frequency of the frequency reference signal 78. Accordingly, the frequency difference value 14b becomes smaller and smaller, approaching zero. Similarly, the phase difference value 20a eventually becomes smaller and smaller, approaching zero.

In some embodiments, when the frequency difference value 14b is above a frequency difference threshold value, the multiplexer output signals 30a is the same as or similar to the filtered signal 28a, which is representative of the position signal 26a. Conversely, when the frequency difference value 14b is below the frequency difference threshold value, the multiplexer output signal 30a is the same as or similar to the frequency reference signal 78, a reference clock signal.

In some other embodiments, when the frequency difference value 14b is above the frequency difference threshold value and when the phase different value 20a is above a phase difference threshold value, the multiplexer output signals 30a is the same as or similar to the filtered signal 28a. Conversely, when the frequency difference value 14b is below the frequency difference threshold and when the phase difference value 20a is below the phase different threshold value, the multiplexer output signal 30a is the same as or similar to the frequency reference signal 78, a reference clock signal.

Thus, in some embodiments, the phase difference processor 20 is not part of the electronic circuit 12.

With the above arrangements, it will be appreciated that electronic circuit 12 first powers up and attempts to run the motor faster and faster based upon the filtered signals 28a, 28b, 28c. However, when the frequency of the filtered signal 28a is sufficiently close to the frequency of the frequency reference signal 78, the electronic circuit 12 switches operation such that the signals 32a, 32b, 32c generated by the trapezoid encoder 32 must have exactly the same frequency as the frequency reference signal 78.

In general, it should be understood that a phase lock loop or frequency locked loop provided by other circuits does not and cannot generate a perfectly stable output frequency. Each one of these loops operates by way of an error signal that is subject to electrical noise and other disturbances. In contrast, the electronic circuit 12 forces the signals 32a, 32b, 32c to be at the same frequency as the frequency reference signal 78. The electronic circuit 12 has no feedback path and does not constitute a frequency locked loop or a phase locked loop. In other words, the electronic circuit 12 causes a so-called "forced" synchronization to the frequency reference signal 78.

Further operation of the electronic circuit 12, and, in particular, of the plurality of modulation waveform generators 34, 36, 38, is described more fully below in conjunction with FIGS. 2-4.

While a trapezoidal encoder 32, a type of pattern generator, is shown, it should be recognized that there are other forms of pattern generators that may be suitable, including, but not limited to, state generators.

While three signal channels corresponding to the three pulse width modulation signals 40a, 42a, 44a are shown, it should be understood that, in other embodiments, there can be more than three or two signal channels. The number of signal channels is generally selected in accordance with a number of position signals, e.g., 26a, 26b, 26c.

Figure 2:
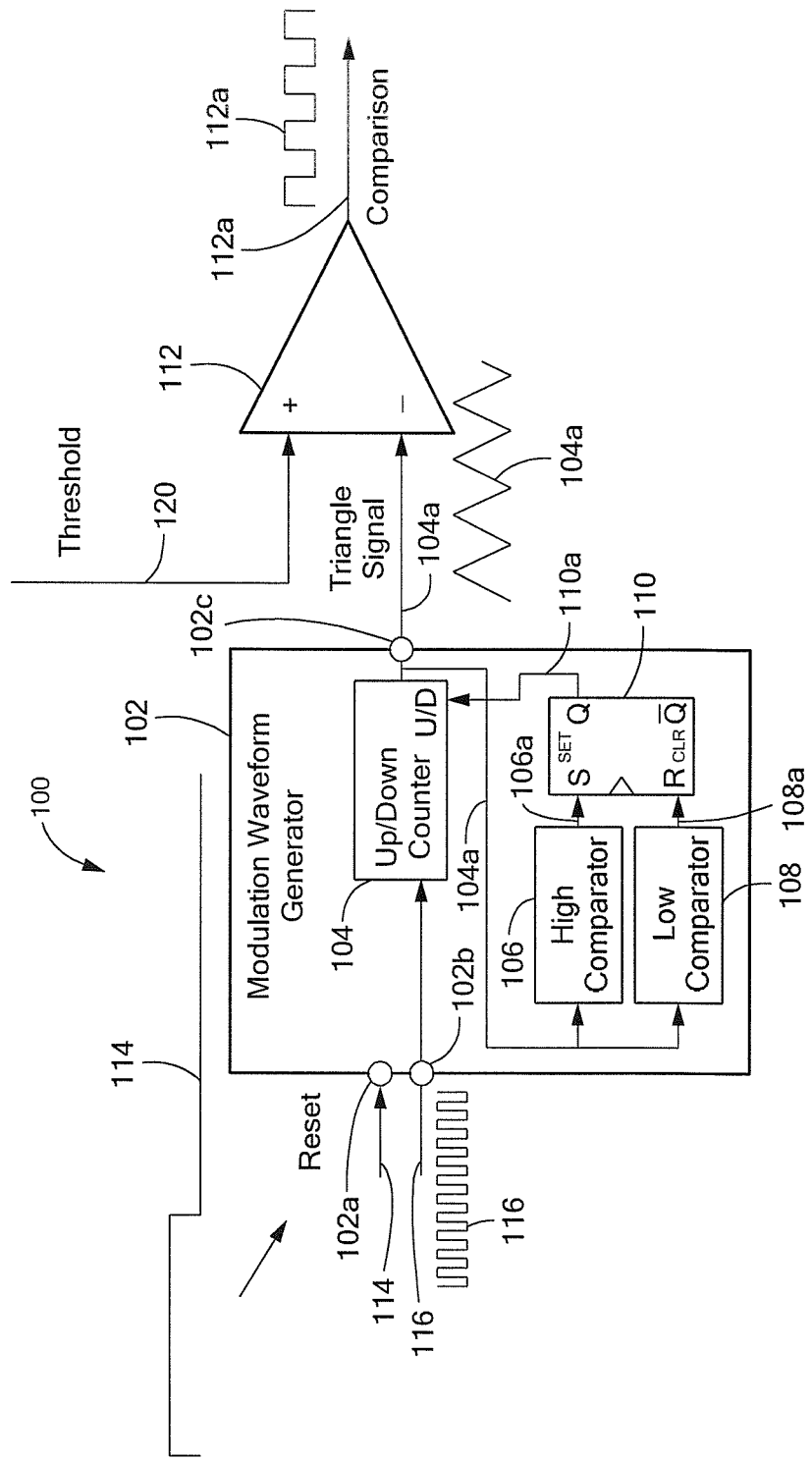
FIG. 2 is a block diagram showing an exemplary modulation waveform generator that can be used as one of the modulation waveform generators in the circuit of FIG. 1.

Referring now to FIG. 2, an exemplary modulation waveform generator 102 is shown in conjunction with an exemplary comparator 112 in a combining circuit 100. The modulation waveform generator 102 can be the same as or similar to one of the modulation waveform generators 34, 36, 38 of FIG. 1. The comparator 112 can be the same as or similar to one of the comparators 40, 42, 44 of FIG. 1.

The modulation waveform generator 102 is coupled to receive a clock signal 116. The clock signal 116 can be the same as or similar to the clock signal 62a of FIG. 1. The modulation waveform generator 102 is also coupled to receive a signal 114 at a reset input 102a. The signal 114 can be the same as or similar to one of the pattern signals 32a, 32b, 32c of FIG. 1.

In the exemplary modulation waveform generator 102, the clock signal 116 is received at a clock input to an up/down counter 104. A high comparator 106 and a low comparator 108 are coupled to receive the count signal 104a, which can be a multi-bit digital signal, from the up down counter 104. The high comparator 106 is configured to provide a high comparison signal 106a and the low comparator 108 is configured to provide a low comparison signal 108a. The high comparison signal 106a and the low comparison signal 108a can be coupled to set and reset inputs, respectively, of a set-reset flip-flop 110. The set-reset flip-flop 110 can provide an up/down direction signal 110a to control the direction of the counting of the up/down counter 104. Thus, it will be recognized that the count signal 104a counts up and then down to generate a triangular signal 104a.

The comparator 112 can be coupled to receive the triangle signal 104a. The comparator 112 can also be coupled to receive a threshold value 120. The threshold value 120 can be the same as or similar to the dithered signal 24a of FIG. 1. The threshold value 120 is generally a fairly static digital signal having a threshold value that can be dithered from time to time in its lower order bits as is apparent from the architecture of FIG. 1.

In operation, the comparator 112 compares the triangle waveform 104a with the threshold value 120, resulting in a comparison signal 112a. The comparison signal can be the same as or similar to one of the comparison signals 40a, 42a, 44a of FIG. 1.

It will be understood that, by changing the value of the threshold value 120, the comparison signal 112a will have a changing duty cycle. Such change will become more apparent from discussion below in conjunction with FIG. 3.

Figure 3:
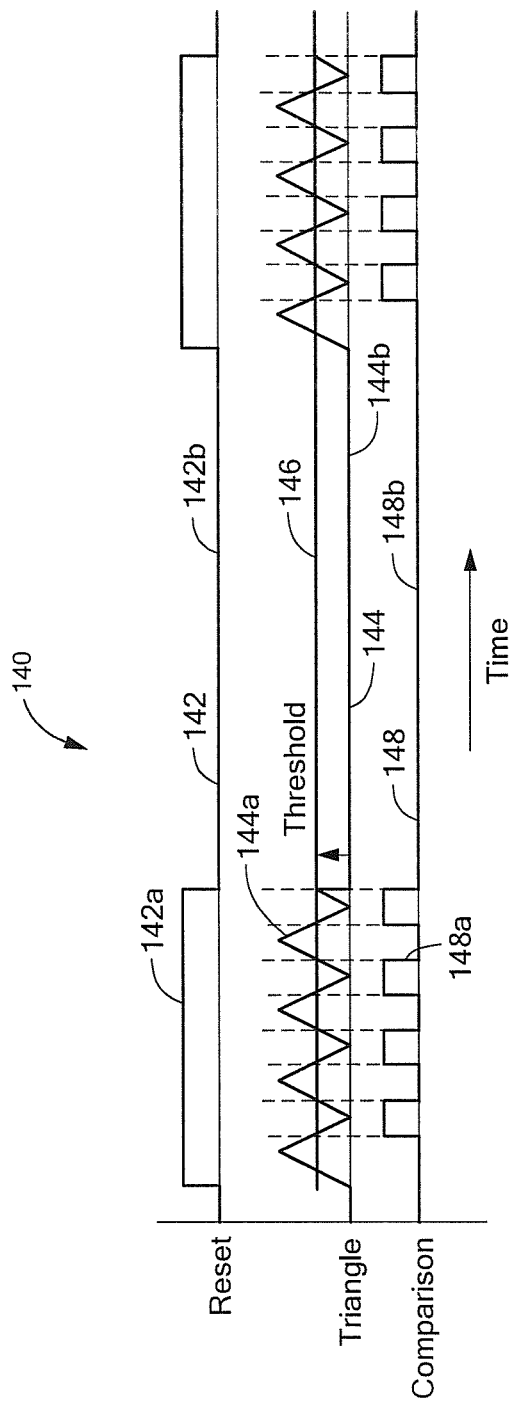
FIG. 3 is a graph showing signal waveforms associated with the modulation waveform generator of FIG. 2.

Referring now to FIG. 3, a graph 140 has a plurality of horizontal axes, each with a scale in units of time in arbitrary units. The graph 140 also has a vertical axis with a scale in units of volts in arbitrary units.

A signal 142 can be the same as or similar to the pattern signal 114 of FIG. 2. The signal 142 can have low states 142b and high states 142a.

A signal 144 can be the same as or similar to the triangle waveform 104a of FIG. 2. The triangle waveform 144 has active regions, of which an active region 144a is an example, and inactive regions, of which an inactive region 144b is an example. The active regions align with high states of the pattern signal 142.

A threshold value 146, here shown without dithering that would otherwise cause slight occasional perturbations of the threshold value 146, can be the same as or similar to the threshold value 120 of FIG. 2.

A signal 148 can be the same as or similar to the comparison signal 112a of FIG. 2. The signal 148 can include active regions, of which an active region 148a is an example, and inactive regions, of which a region 148b is an example. The signal 148 is generated by comparison of the signal 144 with the threshold value 146. It should be appreciated that a duty cycle of the signal 148 can be influenced by a value of the threshold value 146. Thus, the combining circuit 100 of FIG. 2 can be used to generate the signal 148 as a PWM waveform.

Inspection of the circuit 10 of FIG. 1 will also show that the duty cycle of the PWM waveform (signals 40a, 42a, 44a) is influenced by the duty cycle calculation processor 16, which is influenced by the frequency difference processor 14. Thus, the PWM signal 148 tends to have a higher percentage duty cycle (and drive the electric motor 70 harder) if the motor is going too slow, as represented by a frequency of the filtered signal 28a, in relation to the frequency reference signal 78.

Further operation of the electronic circuit of FIG. 1 is described below in conjunction with FIG. 4.

Referring now to FIG. 4, a graph 160 has a plurality of horizontal axes with scales in units of time in arbitrary units. The graph 160 also includes a vertical axis with a scale in units of voltage.

A signal 162 can be the same as or similar to the signal 142 of FIG. 3, the same as or similar to the signal 114 of FIG. 2, and the same as or similar to the one of the signals 32a, 32b, 32c of FIG. 1, for example, the signal 32a. A signal 164 can also be the same as or similar to the signal 142 of FIG. 3, the same as or similar to the signal 114 of FIG. 2, and the same as or similar to another one of the signals 32a, 32b, 32c of FIG. 1, for example, the signal 32b. A signal 164 can also be the same as or similar to the signal 142 of FIG. 3, the same as or similar to the signal 114 of FIG. 2, and the same as or similar to another one of the signals 32a, 32b, 32c of FIG. 1, for example, the signal 32b.

The signals 162, 164, 166 are related to the upper FETs 50, 52, 54 of FIG. 1. Signals 168, 170, 172 are related to the lower FETs 56, 58, 60 of FIG. 1. The signals 168, 170, 172 are described more fully below. The signals 168, 170, 172 can be the same as or similar to the signals 32d, 32e, 32f of FIG. 1.

A signal 176 can be the same as or similar to the signal 144 of FIG. 3, the same as or similar to the signal 104a of FIG. 2, and the same as or similar to one of the signals 34a, 36a, 38a of FIG. 1, for example, the signal 34a. A signal 180 can be the same as or similar to the signal 144 of FIG. 3, the same as or similar to the signal 104a of FIG. 2, and the same as or similar to another one of the signals 34a, 36a, 38a of FIG. 1, for example, the signal 36a. A signal 184 can be the same as or similar to the signal 144 of FIG. 3, the same as or similar to the signal 104a of FIG. 2, and the same as or similar to another one of the signals 34a, 36a, 38a of FIG. 1, for example, the signal 38a.

Threshold values 186, 188, 190, which can be the same threshold value, can be the same as or similar to the threshold value 146 of FIG. 3, the same as or similar to the threshold value 120 of FIG. 2, and the same as or similar to the threshold value 24a of FIG. 1. Dithering is not shown in the threshold values 186, 188, 190, 146, or 120.

A signal 174 can be the same as or similar to the signal 148 of FIG. 3, the same as or similar to the signal 112a of FIG. 2, and the same as or similar to one of the signals 40a, 42a, 44a of FIG. 1, for example, the signal 40a. A signal 178 can be the same as or similar to the signal 148 of FIG. 3, the same as or similar to the signal 112a of FIG. 2, and the same as or similar to another one of the signals 40a, 42a, 44a of FIG. 1, for example, the signal 42a. A signal 182 can be the same as or similar to the signal 148 of FIG. 3, the same as or similar to the signal 112a of FIG. 2, and the same as or similar to another one of the signals 40a, 42a, 44a of FIG. 1, for example, the signal 44a. The signals 174, 178, 180 are generated by comparing the signals 176, 180, 184 with the respective threshold values 186, 188, 190, respectively.

It should be appreciated that duty cycles of the signals 174, 178, 182 can be influenced by values of the threshold values 186, 188, 190. Thus, the signals 174, 178, 182 are representative of PWM signals As described above in conjunction with FIG. 3, the duty cycle of the PWM waveforms 174, 178, 182 is influenced by the duty cycle calculation processor 16, which is influenced by the frequency difference processor 14. Thus, the PWM signal 148 tends to have a higher percentage duty cycle (and drive the electric motor 70 harder) if the motor is going too slow, as represented by a frequency of the filtered signal 28a, in relation to the frequency reference signal 78.

Referring again to the signals 168, 170, 172, those signals are representative of closures (e.g., connections to ground) of the lower FETS of FIG. 1 by way of the signals 32d, 32e, 32f of FIG. 1 in timing relations to the PWM signals 174, 178, 182 applied to the upper FETS.

Further inspection of the signals 176, 180, 184 shows that the triangle waves essentially restart (have the same starting phase) during each instance of active regions of the signals 176, 180, 184. As a result, each one of the PWM signals 174, 178, 182 also has the same starting phase and the same starting signal value. This can result in each one of the PWM signals 174, 178, 182 being the same within their respective active regions and the same within each active region once the motor speed has stabilized. Thus, each one of the PWM signals 174, 178, 182 has no phase jitter from active region to active region. Such a result is achieved by using a separate modulation waveform generators (34, 36, 38 of FIG. 1) for each one of the three signal channels. However, the same result can also be achieved using one modulation waveform generator used in a plurality of signal channels in ways described more fully below.

A time period, p1, is a time period of one rotation of the electric motor 70 of FIG. 1. The time period, p1, is also the sum of the time periods t2−t1, t3−t2, and t4−t3, which are the periods of the signal 162, 164, 166, respectively, and also the periods of the signals 174 and 176, 178 and 180, 182 and 184, respectively.

As will be understood from the discussion above in conjunction with FIG. 1, the PWM signals 174, 178, 182 are representative of the signals 80, 82, 84 of FIG. 1, which drive the electric motor 70. The precise cycle period matches, and the consistency of those cycle periods for each rotation cycle of the electric motor 70, results in the motor 70 having very little jitter in rotation speed.

Referring now to FIG. 5, a graph 200 has a plurality of horizontal axes with scales in units of time in arbitrary units. The graph 200 also includes a vertical axis with a scale in units of voltage. The graph 200 is representative of signal generated within a conventional motor control circuit. Notably, the conventional motor control circuit has one modulation waveform generator and one comparator, forming one signal channel, in contrast to the present invention, which has a plurality of signal channels. To this end, the conventional motor control circuit generates one continuous triangle wave signal 208. A threshold value 210 is compared with the triangle wave signal 208 to generate PWM signals 202, 204, 208, duty cycles of which are influenced by the value of the threshold value 210.

It should be apparent that cycles of the triangle wave signal 200 are not synchronous with rotational periods, p1a, p2a, of the electric motor 70 of FIG. 1.

In the conventional motor drive circuit, signals different from the signal 80, 82, 84 (FIG. 1) drive the electric motor. The PWM signals 202, 204, 206 are representative of the signals that drive the electric motor. It can be seen that in a first cycle, p1a, of rotation of the electric motor, the PWM signals 202, 204, 206 have PWM characteristics that are not the same as during a next cycle, p2a, of rotation of the electric motor. These differences tend to result in jitter in the rotation of the electric motor, which is avoided with the present invention.

Figure 6:
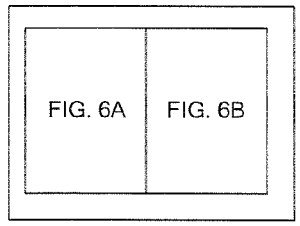
FIG. 6 is a block diagram showing another exemplary motor control circuit having a plurality of modulation waveform generators and having a forced synchronization control, the motor control circuit coupled to an electric motor, the motor having a resolver disposed therein to generate signals representative of an angle of rotation of the motor shaft.
Figure 6A:
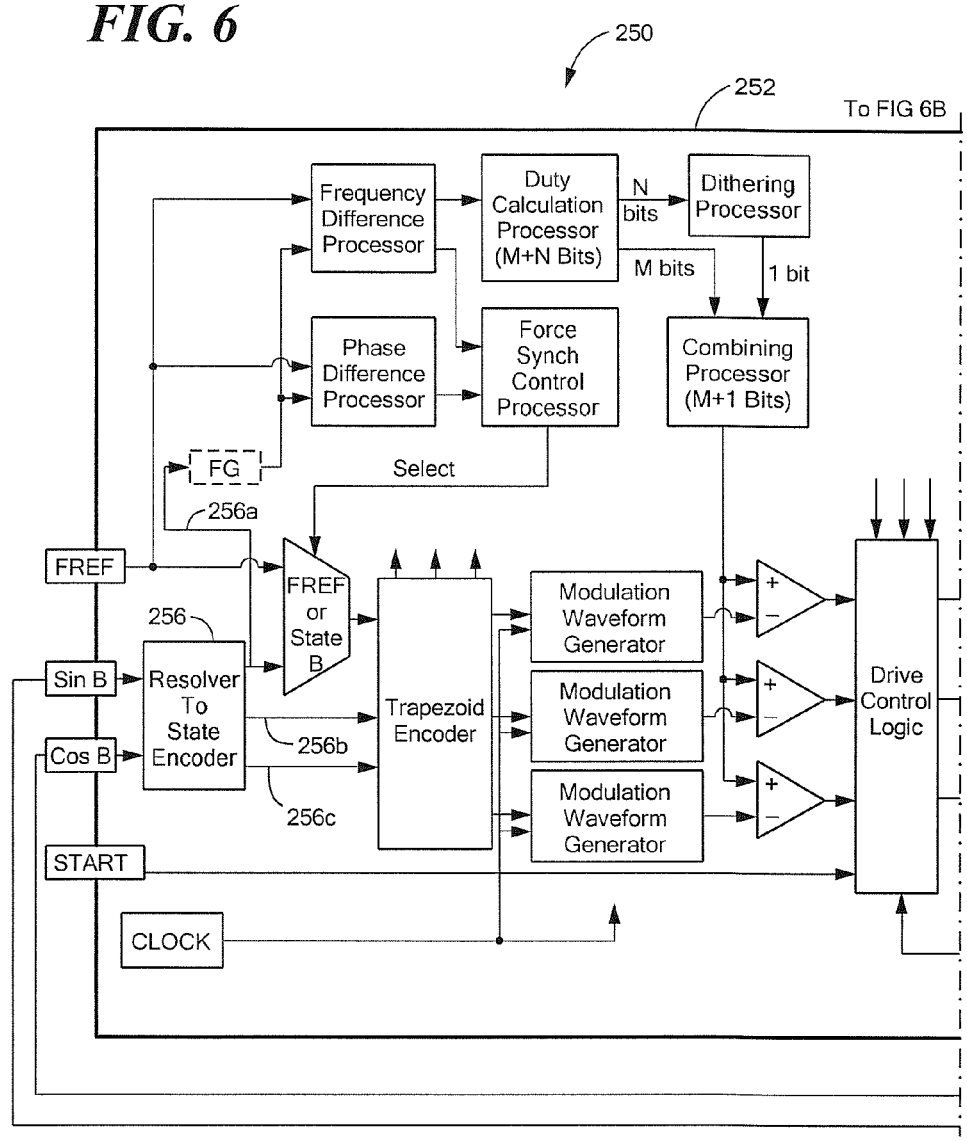
Figure 6B:
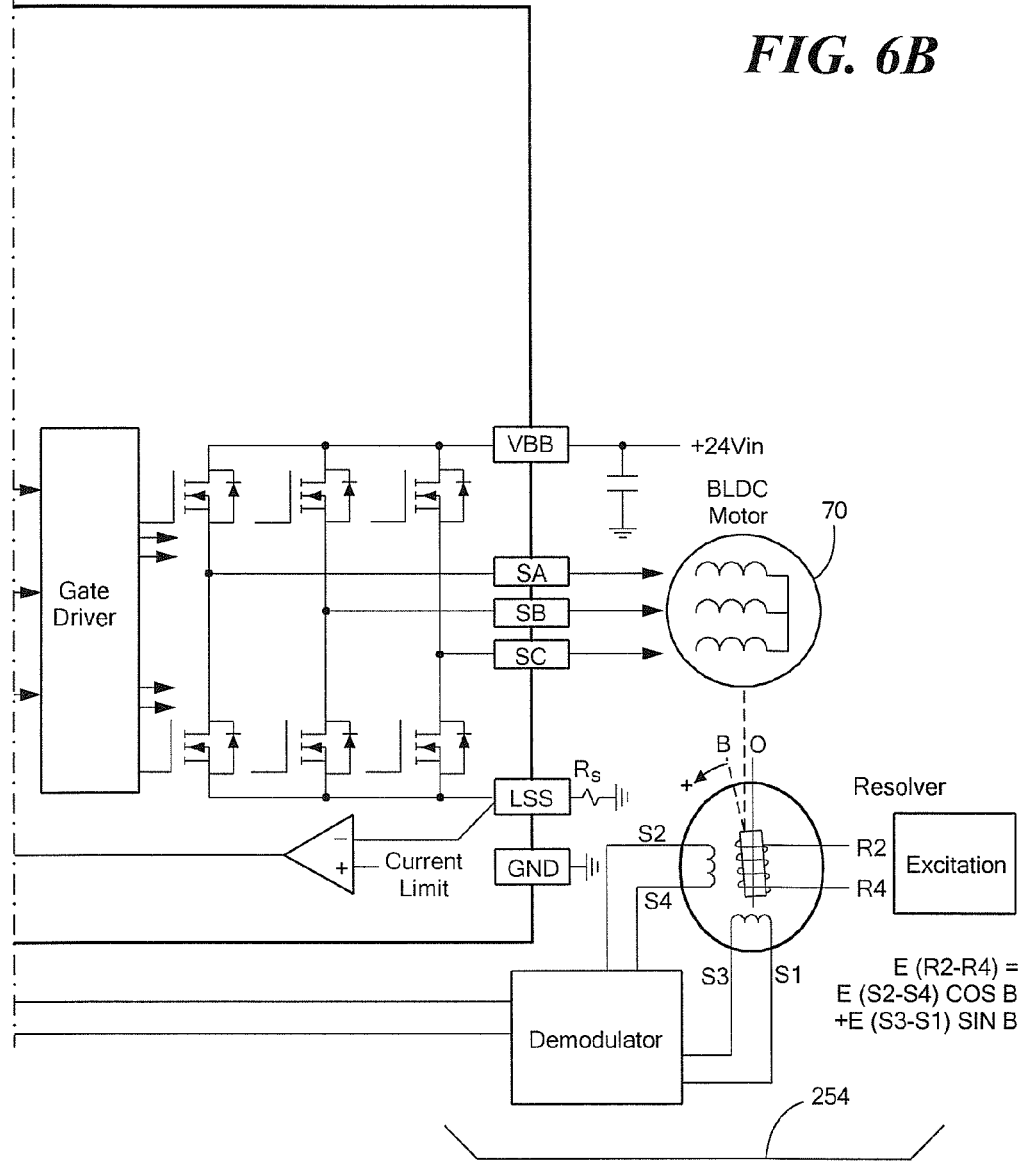

FIGS. 5 and 6 are provided to show that rotational position of the electric motor 70 of FIG. 1 can be detected in ways other than using the Hall array 26 of FIG. 1.

Referring now to FIG. 6, a motor control arrangement includes a motor control circuit 252 coupled to the electric motor 70 and to a resolver 254. A resolver is known in the art of electric motors. The resolver provides sine and cosine signals 254a, 254b, respectively, which can be received by a resolver to state encoder 256 within the motor control circuit 252 to generate three signals 256a, 256b, 256c. The three signals 56a, 256b, 256c, each representative of a rotational position of the shaft of the electric motor 70, are similar to the signals 28a, 28b, 28c of FIG. 1. Thus, operation of the rest of the motor drive circuit 252 is the same as or similar to operation of similar portions of the motor drive circuit 12 of FIG. 1, and is not further discussed.

Figure 7:
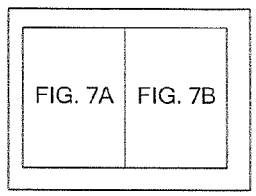
FIG. 7 is a block diagram showing another exemplary motor control circuit having a plurality of modulation waveform generators and having a forced synchronization control, the motor control circuit coupled to an electric motor, the motor control circuit having a back EMF detector coupled to the motor that can generate signals representative of an angle of rotation of the motor shaft.
Figure 7A:
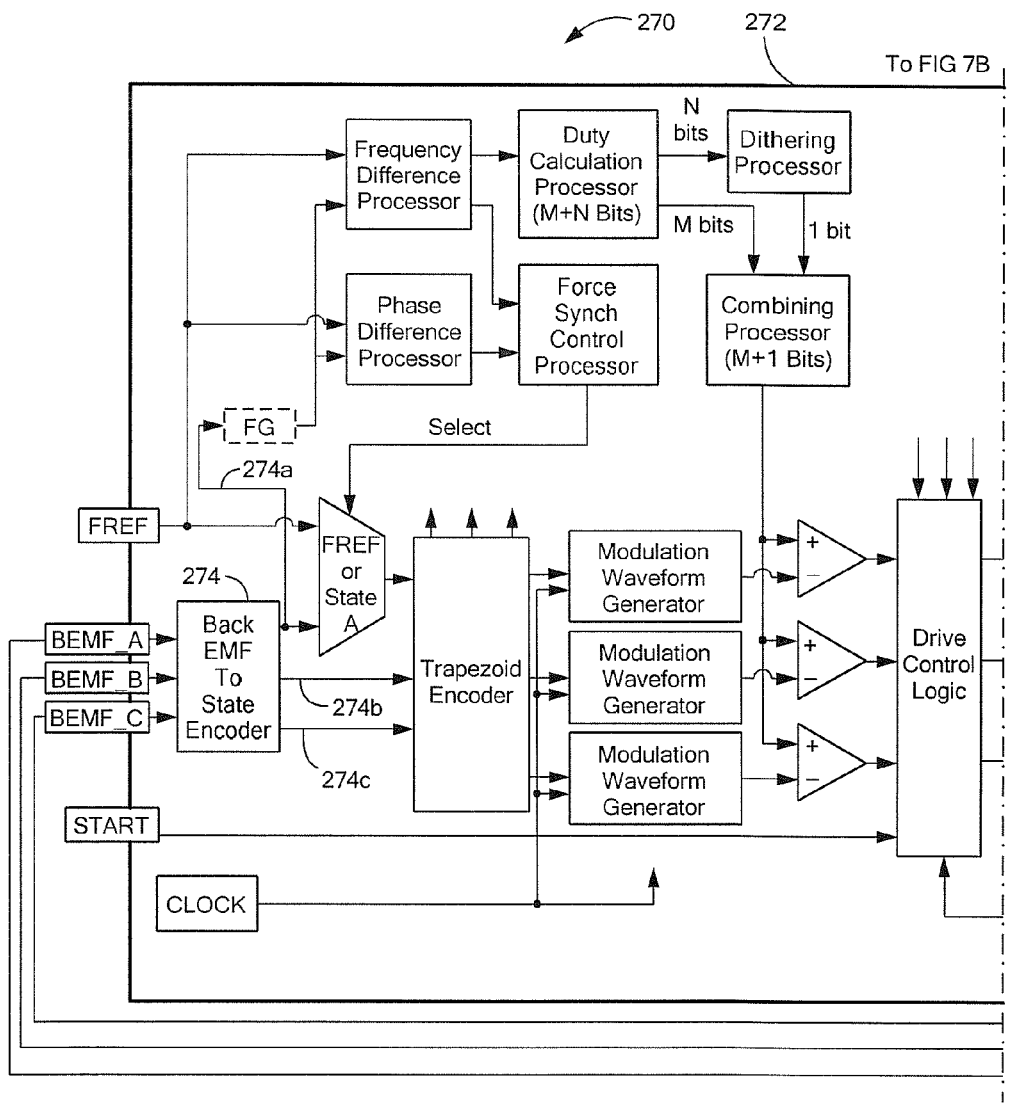
Figure 7B:
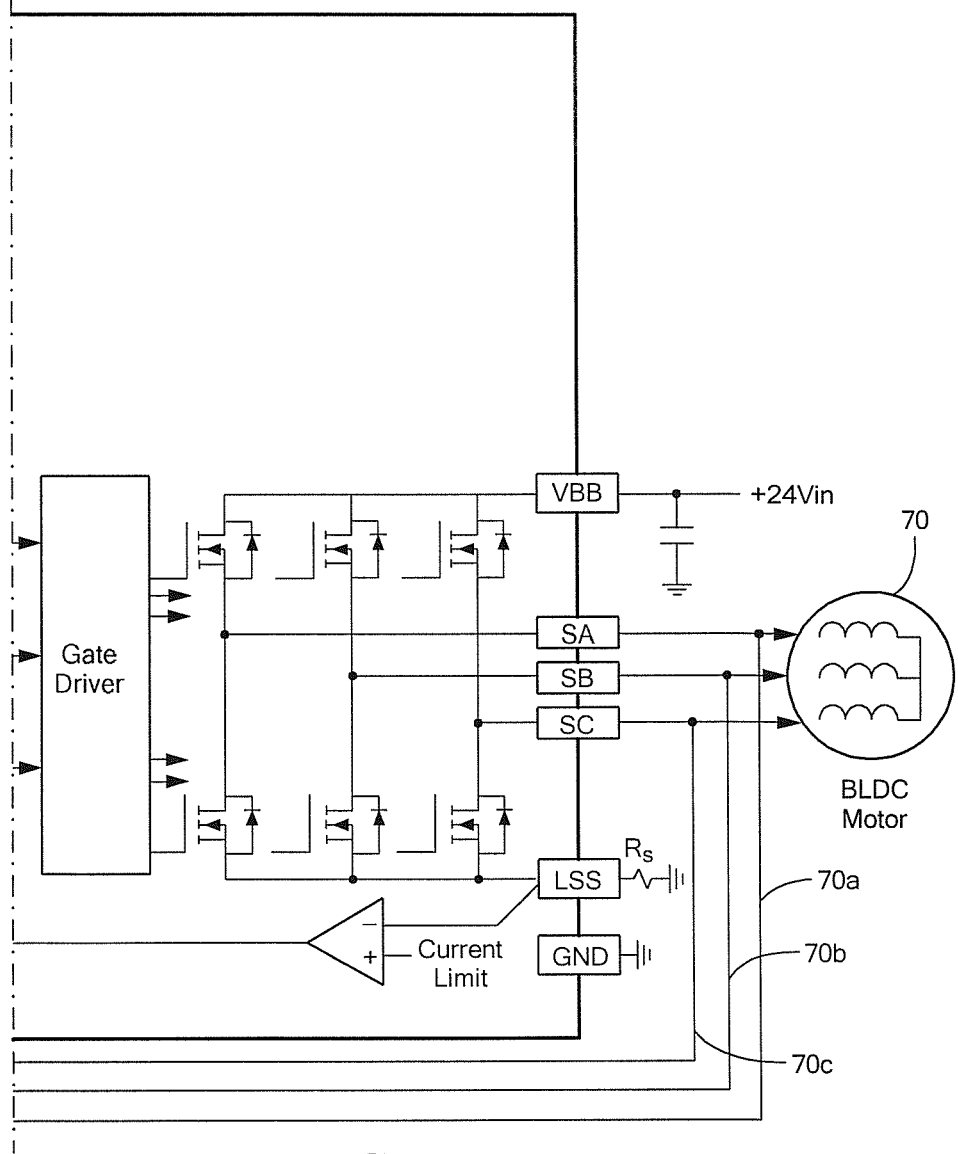

Referring now to FIG. 7, a motor control arrangement 270 includes a motor control circuit 272 coupled to the electric motor 70. The electric motor 70 can provide "back EMF" signals 70a, 70b, 70c, which can be received by a back EMF to state encoder 274 within the motor control circuit 272 to generate three signals 274a, 274b, 274c. The three signals 274a, 274b, 274c, each representative of a rotational position of the shaft of the electric motor 70, are similar to the signals 28a, 28b, 28c of FIG. 1. Thus, operation of the motor drive circuit 272 is the same as or similar to operation of similar portions of the motor drive circuit 12 of FIG. 1, and is not further discussed.

Figure 8:
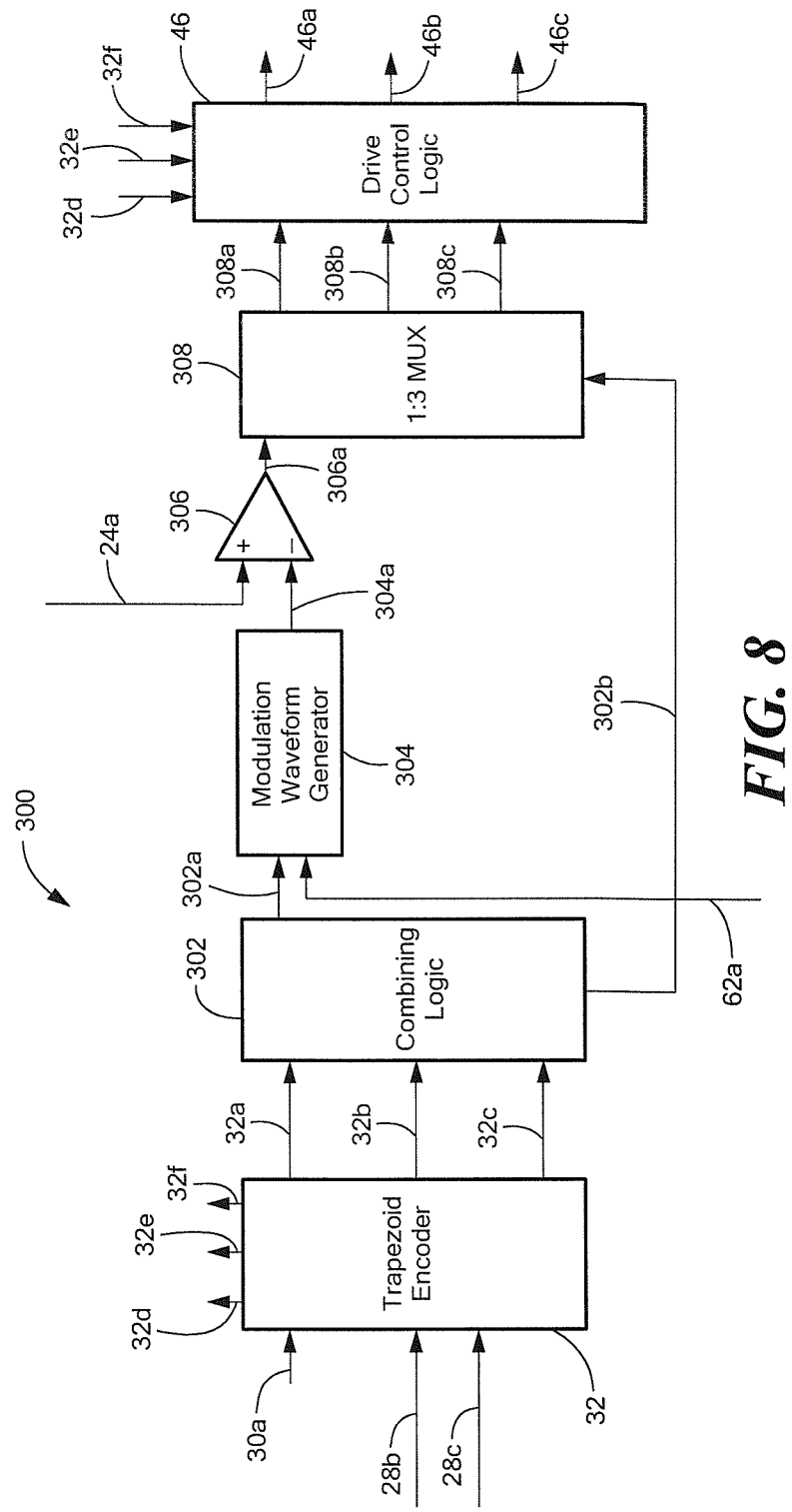
FIG. 8 is a block diagram of a multiplexed arrangement that can replace the plurality of modulation waveform generators of FIG. 1 with one modulation waveform generator used in a multiplexed arrangement.

Referring now to FIG. 8, in which like elements of FIG. 1 are shown having like reference designations, a multiplexed arrangement 300 can replace the three modulation waveform generators 34, 36, 38 and the three comparators 40, 42, 44 of FIG. 1 with one modulation waveform generator 304 and one comparator 306, but used in a multiplexed arrangement to form a plurality of signal channels. The modulation waveform generator 304 can be the same as or similar to the waveform modulation generator 102 of FIG. 2.

Referring briefly to FIG. 4, it can be seen that the triangle waveform signals 176, 180, 184 are generated at different times with no overlap. Importantly, each one of the triangle waveform signals 176, 180, 184 begins at the same point (e.g., from zero) during each one of the periods t2-t1, t3-t2, t4-t3, respectively. In other words, at the beginning of each one of the periods t2-t1, t3-t2, t4-t3, a respective one of the modulation waveform generators 34, 36, 38 of FIG. 1 is allowed to run by a high state of a respective pattern signal 32a, 32b, 32c (see also the reset signal 114 of FIG. 2 and signals 162, 164, 166 of FIG. 4), and it is reset by a low state of a respective pattern signal 32a, 32b, 32c at other times.

Referring again to FIG. 8, combining logic 302 can be coupled to receive the pattern signals 32a, 32b, 32c of FIG. 1. The combining logic 302 is configured to generate a reset signal 302a. The reset signal 302a is received by the modulation waveform generator 304.

In operation, the reset signal 302a is configured to reset the modulation waveform generator 304 at the beginning of each one of the periods t2-t1, t3-t2, t4-t3 of FIG. 4, i.e., at particular transitions of the pattern signals 32a, 32b, 32c. In some embodiments, the reset signal 302a can be comprised of very short reset pulses at the appropriate times. The resets are operable to cause the modulation waveform generator 304 to restart upon each reset pulse. In one particular embodiment, rising edges of the signals 32a, 32b, 32c (i.e., signals 162, 164, 166 of FIG. 4) can be logically ORed to generate reset pulses. However, other techniques to generate reset pulse are also possible.

The modulation waveform generator 304 is also coupled to receive the clock signal 62a of FIG. 1. The modulation waveform generator 304 is configured to generate a triangle wave output signal 304a on one signal channel. The triangle wave output signal 304a is like the signals 176, 180, 184 of FIG. 4, but sequentially, one after the other, on the one signal channel, each restarting in accordance with a transition of one of the pattern signals 32a, 32b, 32c.

A comparator 306 is coupled to receive the triangle wave output signal 304a, coupled to receive the threshold value 24a of FIG. 1, and configured to generate a comparison signal 306a. The comparison signal 306a is like the signals 174, 178, 182 of FIG. 4, but sequentially, one after the other, on one signal channel.

A 1:3 multiplexer 308 can be coupled to receive the comparison signal 306a. The 1:3 multiplexer 308 can also be coupled to receive a control signal 302b from the combining logic 302. The 1:3 multiplexer 308, by control of the control signal 302b, separates (or splits) the comparison signal 306a into generate three separate output signals 308a, 308b, 308c on three separate signal channels. The three output signals 308a, 308b, 308c can be the same as or similar to the three comparison signals 174, 178, 180 to of FIG. 4, and the same as or similar to the three comparison signals 40a, 42a, 44a of FIG. 1.

While three signal channels corresponding to the three pulse width modulation signals 308a, 308b, 308c are shown, it should be understood that, in other embodiments, there can be more than three or two signal channels. The number of signal channels is generally selected in accordance with a number of position signals, e.g., 26a, 26b, 26c (FIG. 1).

Operation of the multiplexed arrangement 300 will be apparent from the discussion above in conjunction with FIGS. 1-4.

It should be understood that the forced synchronization provided by certain circuits within motor control circuits described herein and the plurality of signal channels provided by other certain circuits within the motor control circuits described here, both provide a reduced amount of jitter in the speed of rotation of the shaft of the electric motor. Other embodiments can provide only the force synchronization or only the plurality of signal channels. Furthermore, in other embodiments, the dithering described herein is not used.

All references cited herein are hereby incorporated herein by reference in their entirety. Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A circuit for driving a multi-phase brushless DC motor, the motor having a motor shaft and a plurality of motor windings, the circuit comprising:

a position signal generator configured to generate a plurality of position signals, each one of the plurality of position signals representative of a rotational position of the motor shaft;

a frequency difference processor coupled to receive a signal related to a selected one of the position signals, coupled to receive a reference clock signal, and configured to generate a frequency difference value related to a frequency difference between the signal related to the selected one of the position signals and the reference clock signal;
a synchronization control processor coupled to receive the frequency difference value and configured to generate a synchronization selection signal; and
a multiplexer having a first input node coupled to receive the signal related to the selected one of the position signals, a second input node coupled to receive the reference clock signal, a control node coupled to receive the synchronization control signal, and an output node at which is generated a multiplexer output signal comprised of either the signal related to the selected one of the position signals or the reference clock signal.

2. The circuit of claim 1, wherein, when the frequency difference value is above a frequency difference value threshold, the multiplexer output signal is related to the selected one of the position signals, and when the frequency difference value is below the frequency difference value threshold, the multiplexer output signal is related to the reference clock signal.

3. The circuit of claim 1, further comprising:
a phase difference processor coupled to receive the signal related to the selected one of the position signals, coupled to receive the reference clock signal, and configured to generate a phase difference value related to a phase difference between the signal related to the selected one of the position signals and the reference clock signal, wherein the synchronization control processor is further coupled to receive the phase difference value.

4. The circuit of claim 3, wherein, when the phase difference value is above a phase difference value threshold, the multiplexer output signal is related to the selected one of the position signals, and when the phase difference value is below the phase difference value threshold, the multiplexer output signal is related to the reference clock signal.

5. The circuit of claim 3, wherein, when the frequency difference value is above a frequency difference value threshold and the phase difference value is above the phase difference value threshold, the multiplexer output signal is related to the selected one of the position signals, and when the frequency difference value is below the frequency difference value threshold and the phase difference value is below the phase difference value threshold, the multiplexer output signal is related to the reference clock signal.

6. The circuit of claim 5, further comprising:
a pattern generator coupled to receive the multiplexer output signal, coupled to receive selected ones of the plurality of position signals, and configured to generate a plurality of pattern signals, each pattern signal a predetermined number of degrees apart from other ones of the plurality of pattern signals, each one of the pattern signals having respective first and second states;
a modulation circuit coupled to receive the plurality of pattern signals and configured to generate a corresponding plurality of pulse width modulated (PWM) signals, each one of the plurality of pulse width modulated signals having a respective active region comprising a pulse width modulated waveform only during a selected one of the first or second states of a respective one of the plurality of pattern signals; and
a plurality of drive circuits coupled to receive a plurality of signals representative of the plurality of pulse width modulated signals, wherein the plurality of drive circuits is configured to generate a plurality of drive signals related to the plurality of pulse width modulated signals, each one of the plurality of drive signals configured to couple to one end of a respective one of the plurality of motor windings.

7. The circuit of claim 1, further comprising:
a pattern generator coupled to receive the multiplexer output signal, coupled to receive selected ones of the plurality of position signals, and configured to generate a plurality of pattern signals, each pattern signal a predetermined number of degrees apart from other ones of the plurality of pattern signals, each one of the pattern signals having respective first and second states;
a modulation circuit coupled to receive the plurality of pattern signals and configured to generate a corresponding plurality of pulse width modulated (PWM) signals, each one of the plurality of pulse width modulated signals having a respective active region comprising a pulse width modulated waveform only during a selected one of the first or second states of a respective one of the plurality of pattern signals; and
a plurality of drive circuits coupled to receive a plurality of signals representative of the plurality of pulse width modulated signals, wherein the plurality of drive circuits is configured to generate a plurality of drive signals related to the plurality of pulse width modulated signals, each one of the plurality of drive signals configured to couple to one end of a respective one of the plurality of motor windings.

8. The circuit of claim 7, wherein the modulation circuit comprises:
a plurality of modulation waveform generators, each one of the plurality of modulation waveform generators coupled to receive a respective one of the plurality of pattern signals, wherein the plurality of modulation waveform generators is configured to generate a plurality of function signals, wherein active portions of each one of the plurality of function signals are generated only during a selected state of a respective one of the pattern signals; and
a plurality of comparators, each one of the plurality of comparators coupled to receive a respective one of the plurality of function signals, and each one of the plurality of comparators coupled to receive a respective threshold value, wherein each one of the plurality of comparators is configured to compare the respective one of the plurality of function signals with the respective threshold value to generate a respective one of the plurality of pulse width modulated (PWM) signals having a duty cycle generated in accordance with the respective threshold value.

9. The circuit of claim 8, further comprising a dithering processor configured to generate each respective threshold value as a dithered value.

10. The circuit of claim 7, wherein the modulation circuit comprises:
combining logic coupled to receive the plurality of pattern signals and configured to generate a reset signal having state transitions that occur at state transitions of each one of the plurality of pattern signals;
a modulation waveform generator coupled to receive the reset signal and configured to generate a function signal, wherein active portions of the function signals are generated only during a selected state of the plurality of pattern signals, wherein the function signal is reset to a predetermined condition in accordance with the transitions of the reset signal;

a comparator coupled to receive the function signal, coupled to receive a threshold value, and configured to compare the function signal with the threshold value to generate a pulse width modulated (PWM) signal having a duty cycle generated in accordance with the threshold value; and a multiplexer coupled to receive the pulse width modulated signal and configured to split the pulse width modulated signal into a plurality of different portions, each portion carried on a separate respective signal channel.

11. The circuit of claim 10, further comprising a dithering processor configured to generate the threshold value as a dithered value.

12. A method of driving a multi-phase brushless DC motor, the motor having a motor shaft and a plurality of motor windings, the method comprising:

generating a plurality of position signals, each one of the plurality of position signals representative of a rotational position of the motor shaft;

generating a frequency difference value related to a frequency difference between the signal related to the selected one of the position signals and the reference clock signal;

generating a synchronization selection signal in accordance with the frequency difference value; and generating, in accordance with the synchronization selection signal, a multiplexer output signal comprised of either the signal related to the selected one of the position signals or the reference clock signal.

13. The method of claim 12, wherein, when the frequency difference value is above a frequency difference value threshold, the multiplexer output signal is related to the selected one of the position signals, and when the frequency difference value is below the frequency difference value threshold, the multiplexer output signal is related to the reference clock signal.

14. The method of claim 12, further comprising:

generating a phase difference value related to a phase difference between the signal related to the selected one of the position signals and the reference clock signal.

15. The method of claim 14, wherein, when the phase difference value is above a phase difference value threshold, the multiplexer output signal is related to the selected one of the position signals, and when the phase difference value is below the phase difference value threshold, the multiplexer output signal is related to the reference clock signal.

16. The method of claim 14, wherein, when the frequency difference value is above a frequency difference value threshold and the phase difference value is above the phase difference value threshold, the multiplexer output signal is related to the selected one of the position signals, and when the frequency difference value is below the frequency difference value threshold and the phase difference value is below the phase difference value threshold, the multiplexer output signal is related to the reference clock signal.

17. The method of claim 16, further comprising:

generating a plurality of pattern signals, each pattern signal a predetermined number of degrees apart from other ones of the plurality of pattern signals, each one of the pattern signals having respective first and second states;

generating a corresponding plurality of pulse width modulated (PWM) signals, each one of the plurality of pulse width modulated signals having a respective active region comprising a pulse width modulated waveform only during a selected one of the first or second states of a respective one of the plurality of pattern signals; and generating a plurality of drive signals related to the plurality of pulse width modulated signals, each one of the plurality of drive signals configured to couple to one end of a respective one of the plurality of motor windings.

18. The method of claim 12, further comprising:

generating a plurality of pattern signals, each pattern signal a predetermined number of degrees apart from other ones of the plurality of pattern signals, each one of the pattern signals having respective first and second states;

generating a corresponding plurality of pulse width modulated (PWM) signals, each one of the plurality of pulse width modulated signals having a respective active region comprising a pulse width modulated waveform only during a selected one of the first or second states of a respective one of the plurality of pattern signals; and generating a plurality of drive signals related to the plurality of pulse width modulated signals, each one of the plurality of drive signals configured to couple to one end of a respective one of the plurality of motor windings.

19. The method of claim 18, wherein the generating the plurality of pulse width modulated (PWM) signals comprises:

generating a plurality of function signals, wherein active portions of each one of the plurality of function signals are generated only during a selected state of a respective one of the pattern signals; and comparing the respective one of the plurality of function signals with a respective threshold value to generate a respective one of the plurality of pulse width modulated (PWM) signals having a duty cycle generated in accordance with the respective threshold value.

20. The method of claim 19, further comprising generating each respective threshold value as a dithered value.

21. The method of claim 18, wherein the generating the plurality of pulse width modulated (PWM) signals comprises:

generating a reset signal having state transitions that occur at state transitions of each one of the plurality of pattern signals;

generating a function signal, wherein active portions of the function signals are generated only during a selected state of the plurality of pattern signals, wherein the function signal is reset to a predetermined condition in accordance with the transitions of the reset signal;

comparing the function signal with the threshold value to generate a pulse width modulated (PWM) signal having a duty cycle generated in accordance with the threshold value; and splitting the pulse width modulated signal into a plurality of different portions, each portion carried on a separate respective signal channel.

22. The method of claim 21, further comprising generating the threshold value as a dithered value.

* * * * *

UNITED STATES PATENT AND TRADEMARK OFFICE
CERTIFICATE OF CORRECTION

Page 1 of 1

PATENT NO.       : 8,638,053 B2
APPLICATION NO.  : 13/278458
DATED            : January 28, 2014
INVENTOR(S)      : Chee-Kiong Ng It is certified that error appears in the above-identified patent and that said Letters Patent is hereby corrected as shown below:

In the Specification

Column 3, line 63 delete "or the tends" and replace with --or that tends--.

Column 4, Line 31 delete "(SA, SB, SB," and replace with --(SA, SB, SC,--.

Column 5, line 33 delete "40, 42, 46" and replace with --40, 42, 44--.

Column 7, line 20 delete "different" and replace with --difference--.

Column 7, line 25 delete "different" and replace with --difference--.

Column 11, line 16 delete "56a, 256b, 256c," and replace with --256a, 256b, 256c,--.

Column 12, line 24 delete "306a into generate" and replace with --306a to generate--.

Column 12, line 27 delete "180 to of FIG. 4," and replace with --180 of FIG. 4,--.

Signed and Sealed this
Twenty-ninth Day of September, 2015

Michelle K. Lee
*Director of the United States Patent and Trademark Office*